US012640857B2

(12) United States Patent
Qiao et al.

(10) Patent No.: US 12,640,857 B2
(45) Date of Patent: May 26, 2026

(54) METHOD FOR CONTROLLING FREQUENCY HOPPING

(71) Applicant: BEIJING XIAOMI MOBILE SOFTWARE CO., LTD., Beijing (CN)

(72) Inventors: Xuemei Qiao, Beijing (CN); Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 318 days.

(21) Appl. No.: 18/272,538

(22) PCT Filed: Jan. 15, 2021

(86) PCT No.: PCT/CN2021/072285
§ 371 (c)(1),
(2) Date: Jul. 14, 2023

(87) PCT Pub. No.: WO2022/151406
PCT Pub. Date: Jul. 21, 2022

(65) Prior Publication Data
US 2024/0072950 A1    Feb. 29, 2024

(51) Int. Cl.
*H04L 5/00* (2006.01)
*H04W 72/232* (2023.01)

(52) U.S. Cl.
CPC .......... *H04L 5/0012* (2013.01); *H04L 5/0078* (2013.01); *H04W 72/232* (2023.01)

(58) Field of Classification Search
CPC ......... H04L 1/08; H04L 1/1812; H04L 5/001; H04L 5/0012; H04L 5/0078;
(Continued)

(56) References Cited

U.S. PATENT DOCUMENTS 12,375,243 B2 * 7/2025 Abdelghaffar ............ H04L 1/04
2010/0188254 A1 * 7/2010 Johnson ................ H04W 36/30
340/870.02
(Continued)

FOREIGN PATENT DOCUMENTS

CN    109600211 A    4/2019
CN    111756477 A    10/2020
(Continued)

OTHER PUBLICATIONS

U.S. Appl. No. 62/706,418 (Year: 2020).*
(Continued)

*Primary Examiner* — Dung B Huynh
(74) *Attorney, Agent, or Firm* — Cozen O'Connor

(57) ABSTRACT

A method for controlling frequency hopping, performed by a user equipment (UE), includes: determining a frequency hopping offset, a number of frequency hopping, and a frequency hopping time domain granularity; and performing frequency hopping based on the frequency hopping offset, the number of frequency hopping, and the frequency hopping time domain granularity. A method for controlling frequency hopping, performed by a base station, includes: sending indication information to a UE, wherein the indication information is configured to indicate the UE to determine one or more of a frequency hopping offset, a number of frequency hopping, and a frequency hopping time domain granularity.

15 Claims, 4 Drawing Sheets

(58) Field of Classification Search
CPC ............... H04L 5/0094; H04B 1/7143; H04B 2201/71384; H04W 72/232
See application file for complete search history.

(56) References Cited

U.S. PATENT DOCUMENTS

| | | | | |
|---|---|---|---|---|
| 2015/0195069 A1* | 7/2015 | Yi | ......................... | H04L 5/0053 370/329 |
| 2015/0280777 A1* | 10/2015 | Azizi | ............... | H04W 52/0216 370/330 |
| 2016/0081101 A1* | 3/2016 | Yu | ......................... | H04W 84/12 370/329 |
| 2016/0277065 A1* | 9/2016 | Xie | ...................... | H04B 1/7143 |
| 2017/0142702 A1* | 5/2017 | Yu | ...................... | H04W 72/20 |
| 2017/0245313 A1* | 8/2017 | Kim | ...................... | H04L 1/1671 |
| 2017/0346607 A1* | 11/2017 | Chen | ...................... | H04L 1/189 |
| 2018/0109286 A1* | 4/2018 | Yao | ......................... | H04W 4/70 |
| 2018/0143289 A1* | 5/2018 | Guy | ......................... | G01S 5/10 |
| 2018/0227011 A1* | 8/2018 | Yerramalli | ............. | H04B 1/713 |
| 2018/0367051 A1* | 12/2018 | Agamy | ............ | H02M 3/33584 |
| 2019/0028143 A1* | 1/2019 | Zhang | ................ | H04B 1/7143 |
| 2019/0045553 A1* | 2/2019 | Zhang | .................... | H04W 4/80 |
| 2019/0059081 A1* | 2/2019 | Medles | ............... | H04B 1/7143 |
| 2019/0149365 A1* | 5/2019 | Chatterjee | ............ | H04W 76/11 370/329 |
| 2019/0281418 A1* | 9/2019 | Chen | ...................... | H04W 4/70 |
| 2019/0356446 A1* | 11/2019 | Kim | ...................... | H04L 5/0053 |
| 2019/0394706 A1* | 12/2019 | Phan | .................... | H04W 48/16 |
| 2020/0014515 A1* | 1/2020 | Qin | ...................... | H04L 5/0051 |
| 2020/0022162 A1* | 1/2020 | Yang | ...................... | H04B 1/7143 |
| 2020/0044687 A1* | 2/2020 | Wechsler | ............. | H04B 1/7143 |
| 2020/0106475 A1* | 4/2020 | Chen | .................... | H04W 80/02 |
| 2020/0163032 A1* | 5/2020 | Su | ......................... | H04L 5/0053 |
| 2020/0177233 A1* | 6/2020 | Kneissl | ............... | H04B 1/7136 |
| 2020/0187248 A1* | 6/2020 | Lee | ...................... | H04W 74/004 |
| 2020/0204407 A1* | 6/2020 | Liu | ..................... | H04L 27/2607 |
| 2020/0213161 A1* | 7/2020 | Zhang | .................. | H04W 80/08 |
| 2020/0229180 A1* | 7/2020 | Liu | ...................... | H04L 5/0092 |
| 2020/0252847 A1* | 8/2020 | Park | ...................... | H04W 76/27 |
| 2020/0280404 A1* | 9/2020 | Qin | ...................... | H04L 5/0048 |
| 2020/0350949 A1* | 11/2020 | Rico Alvarino | ...... | H04L 5/0094 |
| 2021/0160023 A1* | 5/2021 | Liu | ...................... | H04L 5/0053 |
| 2021/0160780 A1* | 5/2021 | Liu | ...................... | H04L 5/001 |
| 2021/0168858 A1* | 6/2021 | Liu | ...................... | H04L 5/0012 |
| 2021/0176031 A1* | 6/2021 | Babaei | .................. | H04L 5/0096 |
| 2021/0195652 A1* | 6/2021 | Taherzadeh Boroujeni | ................ | H04W 74/0833 |
| 2021/0203397 A1* | 7/2021 | Xiong | .................. | H04W 72/23 |
| 2021/0218502 A1* | 7/2021 | Park | ...................... | H04W 72/23 |
| 2021/0251016 A1* | 8/2021 | Xiong | .................. | H04L 1/1858 |
| 2021/0274527 A1* | 9/2021 | Nakamura | ............ | H04L 5/0044 |
| 2021/0281371 A1* | 9/2021 | Wei | ...................... | H04L 5/0012 |
| 2021/0297985 A1* | 9/2021 | Liu | ...................... | H04W 16/14 |
| 2021/0329535 A1* | 10/2021 | Chou | ...................... | H04L 1/0009 |
| 2021/0345122 A1* | 11/2021 | Liu | ...................... | H04L 5/0053 |
| 2021/0351888 A1* | 11/2021 | Park | ...................... | H04W 72/51 |
| 2021/0360510 A1* | 11/2021 | Zheng | .................. | H04L 5/0048 |
| 2021/0360616 A1* | 11/2021 | Yi | ...................... | H04L 5/0053 |
| 2022/0086870 A1* | 3/2022 | Hu | ........................... | H04L 1/08 |
| 2022/0104187 A1* | 3/2022 | Zhou | ................ | H04W 72/0446 |
| 2022/0109466 A1* | 4/2022 | Manolakos | ............ | H04B 1/713 |
| 2022/0110128 A1* | 4/2022 | Takahashi | ............. | H04L 5/0044 |
| 2022/0124822 A1* | 4/2022 | Taherzadeh Boroujeni | ................ | H04L 1/189 |
| 2022/0150003 A1* | 5/2022 | Takeda | .................. | H04L 1/1893 |
| 2022/0182160 A1* | 6/2022 | Su | ......................... | H04B 17/309 |
| 2022/0201772 A1* | 6/2022 | Shin | ...................... | H04W 72/23 |
| 2022/0225428 A1* | 7/2022 | Xiong | .................. | H04W 72/044 |
| 2022/0232556 A1* | 7/2022 | Ren | ...................... | H04W 72/23 |
| 2022/0264608 A1* | 8/2022 | Bae | ...................... | H04L 5/0053 |

| | | | | |
|---|---|---|---|---|
| 2022/0279523 A1* | 9/2022 | He | ......................... | H04L 1/1864 |
| 2022/0338217 A1* | 10/2022 | Li | ......................... | H04W 72/23 |
| 2022/0345266 A1* | 10/2022 | Zheng | ..................... | H04L 5/001 |
| 2022/0393793 A1* | 12/2022 | Mu | ...................... | H04B 1/7136 |
| 2022/0400508 A1* | 12/2022 | Oteri | ..................... | H04W 72/23 |
| 2022/0408285 A1* | 12/2022 | Hong | ............... | H04L 27/26025 |
| 2023/0015550 A1* | 1/2023 | Lin | ...................... | H04L 5/0012 |
| 2023/0034062 A1* | 2/2023 | Wei | ...................... | H04L 5/0012 |
| 2023/0041603 A1* | 2/2023 | Cirik | ..................... | H04B 7/088 |
| 2023/0057994 A1* | 2/2023 | Elkotby | ............. | H04B 7/06952 |
| 2023/0058265 A1* | 2/2023 | Yao | ...................... | H04L 5/0048 |
| 2023/0067551 A1* | 3/2023 | Wu | ................ | H04W 72/0453 |
| 2023/0068475 A1* | 3/2023 | Yang | ........................ | H04L 1/08 |
| 2023/0084494 A1* | 3/2023 | Wei | ...................... | H04L 5/0044 370/329 |
| 2023/0139311 A1* | 5/2023 | Hu | .................... | H04W 72/1273 370/329 |
| 2023/0188261 A1* | 6/2023 | Awadin | ................ | H04L 1/1864 370/329 |
| 2023/0224953 A1* | 7/2023 | Xiong | ................... | H04L 5/0044 370/329 |
| 2023/0239932 A1* | 7/2023 | Yu | ......................... | H04B 1/713 370/328 |
| 2023/0254891 A1* | 8/2023 | Gao | .................... | H04W 74/002 370/329 |
| 2023/0275713 A1* | 8/2023 | Mu | ...................... | H04L 5/0012 370/330 |
| 2023/0276502 A1* | 8/2023 | Zuo | .................... | H04W 74/006 370/329 |
| 2023/0291515 A1* | 9/2023 | Dai | ...................... | H04L 1/1819 |
| 2023/0318759 A1* | 10/2023 | Hao | ..................... | H04L 5/0044 370/329 |
| 2023/0319898 A1* | 10/2023 | Lei | .................... | H04W 74/0833 370/328 |
| 2023/0328705 A1* | 10/2023 | Nhan | ................... | H04L 5/0012 370/329 |
| 2023/0345230 A1* | 10/2023 | Yu | ......................... | H04L 5/0051 |
| 2023/0389082 A1* | 11/2023 | Echigo | ............. | H04L 5/0012 |
| 2023/0396387 A1* | 12/2023 | Harrison | ............... | H04L 5/0094 |
| 2024/0049191 A1* | 2/2024 | Takahashi | ............ | H04W 72/20 |
| 2024/0072950 A1* | 2/2024 | Qiao | .................... | H04L 5/0094 |
| 2024/0073887 A1* | 2/2024 | Bae | ................... | H04W 72/1268 |
| 2024/0284494 A1* | 8/2024 | Kim | ......................... | H04L 1/08 |
| 2024/0380429 A1* | 11/2024 | Lin | .................... | H04W 72/04 |
| 2025/0055628 A1* | 2/2025 | Yao | ...................... | H04L 1/1893 |
| 2025/0254734 A1* | 8/2025 | Han | ................. | H04W 74/0833 |

FOREIGN PATENT DOCUMENTS

| | | |
|---|---|---|
| CN | 111756511 A | 10/2020 |
| WO | WO 2016053047 A1 | 4/2016 |
| WO | WO 2021004172 A1 | 1/2021 |

OTHER PUBLICATIONS

U.S. Appl. No. 63/093,005 (Year: 2020).*
Indian patent application No. 202347054156, Office Action dated Sep. 24, 2024, 6 pages.
Chinese patent application No. 202180000177.X, First Office Action dated Apr. 1, 2023, 10 pages.
Chinese patent application No. 202180000177.X, English translation of First Office Action dated Apr. 1, 2023, 11 pages.
NTT DOCOMO, Inc, "Offline summary for UL data transmission procedure", 3GPP TSG RAN WG1 Meeting #94, R1-1809767, Aug. 2018, 35 pages.
PCT/CN2021/072285, International Search Report dated Oct. 14, 2021, 2 pages.
3GPP Technical Specification Group Radio Access Network; NR; Physical layer procedures for control (Release 16), 3GPP TS 38.213, vol. RAN WG1, No. V16.4.0, Jan. 8, 2021; 185 pages.

* cited by examiner

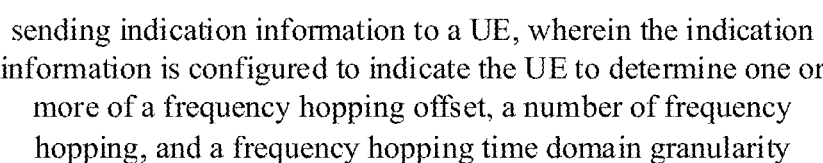

701 sending indication information to a UE, wherein the indication information is configured to indicate the UE to determine one or more of a frequency hopping offset, a number of frequency hopping, and a frequency hopping time domain granularity

FIG. 7

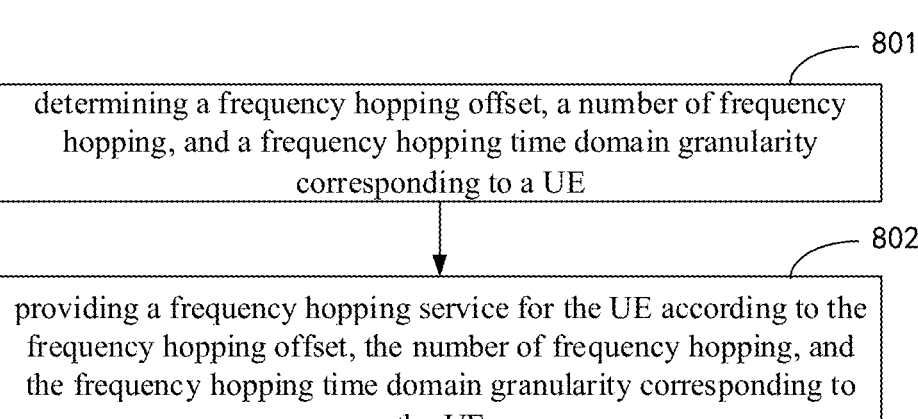

801 determining a frequency hopping offset, a number of frequency hopping, and a frequency hopping time domain granularity corresponding to a UE

802 providing a frequency hopping service for the UE according to the frequency hopping offset, the number of frequency hopping, and the frequency hopping time domain granularity corresponding to the UE

FIG. 8

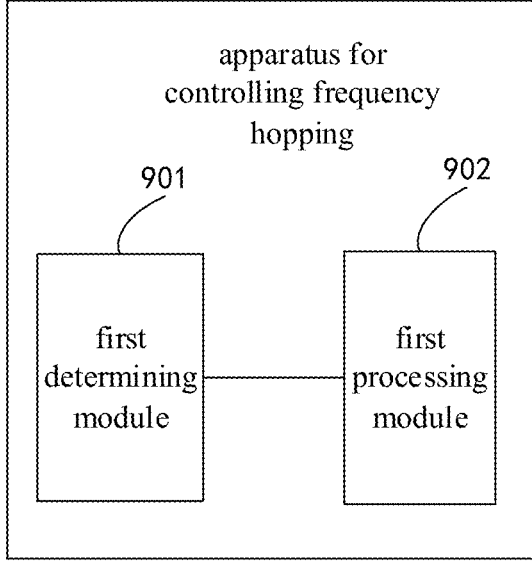

apparatus for controlling frequency hopping

901

902 first determining module first processing module

FIG. 9

METHOD FOR CONTROLLING FREQUENCY HOPPING

CROSS REFERENCE TO RELATED APPLICATION

This application is a US national phase application of International Application No. PCT/CN2021/072285, filed on Jan. 15, 2021, the entirety of which is hereby incorporated by reference.

TECHNICAL FIELD

The present disclosure relates to the field of wireless communication technologies, in particular to, a method for controlling frequency hopping.

BACKGROUND

When communicating wirelessly, a frequency hopping (FH) technology may be adopted in order to ensure confidentiality of data transfer and prevent interference between the wireless transmission and other wireless signals in the vicinity. When a transmission quality on one frequency is low, transmission communication may be performed by skipping to another frequency.

SUMMARY

An embodiment of the present disclosure in a first aspect provides a method for controlling frequency hopping, performed by a user equipment (UE). The method includes determining a frequency hopping offset, a number of frequency hopping, and a frequency hopping time domain granularity; and performing frequency hopping based on the frequency hopping offset, the number of frequency hopping, and the frequency hopping time domain granularity.

An embodiment of the present disclosure in a second aspect provides a method for controlling frequency hopping, performed by a base station. The method includes sending indication information to a UE, in which, the indication information is configured to indicate the UE to determine one or more of a frequency hopping offset, a number of frequency hopping, and a frequency hopping time domain granularity.

An embodiment of the present disclosure in a third aspect provides a method for controlling frequency hopping, performed by a base station. The method includes determining a frequency hopping offset, a number of frequency hopping, and a frequency hopping time domain granularity corresponding to a UE; and providing a frequency hopping service for the UE according to the frequency hopping offset, the number of frequency hopping, and the frequency hopping time domain granularity corresponding to the UE.

Additional aspects and advantages of the present disclosure will be partially given in the following description, and some will become obvious from the following description, or be understood through practice of the present disclosure.

BRIEF DESCRIPTION OF THE DRAWINGS

The above-mentioned and/or additional aspects and advantages of the present disclosure will be apparent and readily understood from the following description of embodiments taken in conjunction with the accompanying drawings, in which:

FIG. 7 is a flowchart illustrating a method for controlling frequency hopping provided in an embodiment of the present disclosure.

FIG. 8 is a flowchart illustrating another method for controlling frequency hopping provided in an embodiment of the present disclosure.

FIG. 9 is a schematic diagram illustrating a structure of an apparatus for controlling frequency hopping provided in an embodiment of the present disclosure.

DETAILED DESCRIPTION

Figure 1:
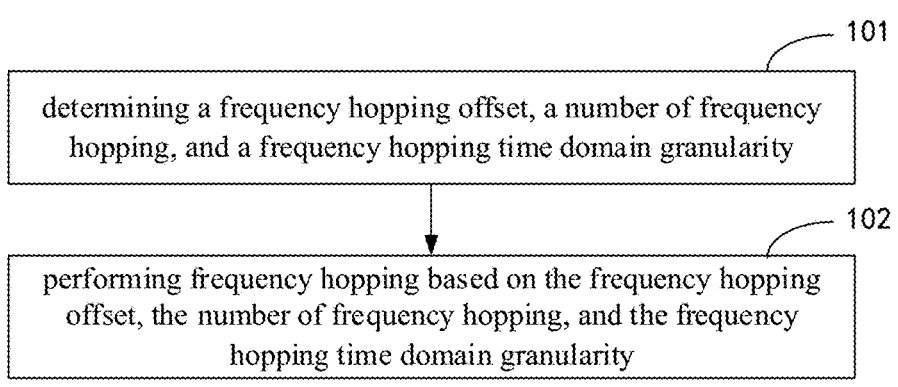
FIG. 1 is a flowchart illustrating a method for controlling frequency hopping provided in an embodiment of the present disclosure.

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are illustrative and intended to explain the present disclosure, not construed to limit the present disclosure.

In related arts, due to limited uplink coverage capability, coverage enhancement is required. Therefore, the present disclosure performs coverage enhancement through Message3 type A Repetition (repetition). A frequency diversity gain may be obtained through a FH (frequency hopping) mechanism of Message3 Inter-slot. Therefore, how to configure inter-slot FH related parameters for Message3 has become an urgent problem to be solved. Of course, in an embodiment of the present disclosure, description is made by taking Message3 as an example, but in other embodiments of the present disclosure, other information may also be transmitted, such as call establishment information, call clearing information, connection management information, channel release information, system information, channel establishment information, etc.

For this problem, embodiments of the present disclosure provide a method and an apparatus for controlling frequency hopping.

FIG. 1 is a flowchart illustrating a method for controlling frequency hopping provided in an embodiment of the present disclosure. The method is performed by a UE to perform frequency hopping after frequency hopping determining parameters of a frequency hopping offset, a number of frequency hopping, and a frequency hopping time domain granularity are determined by the UE. It should be noted that in an embodiment of the present disclosure, the frequency hopping parameters include the hopping offset value, the number of frequency hopping, and the frequency hopping time domain granularity. The frequency hopping offset is configured to determine a starting position of each hop. The number of frequency hopping is configured to achieve a higher frequency diversity gain by configuring a plurality of frequency domain positions. The frequency hopping time domain granularity is configured to, by expanding a basic granularity of time domain frequency hopping, support cross-slot joint channel estimation, or reduce a DMRS (demodulation reference signal) density for a low mobility or stationary UE.

As illustrated in FIG. 1, the method for controlling frequency hopping includes the following steps.

At step 101, a frequency hopping offset, a number of frequency hopping, and a frequency hopping time domain granularity are determined. In an embodiment of the present disclosure, frequency hopping may be understood as a technique of transmitting at different times on different frequencies in communication to cope with frequency selective fading. In an embodiment of the present disclosure, the frequency hopping may be determined based on three frequency hopping parameters of the frequency hopping offset, the number of frequency hopping, and the frequency hopping time domain granularity.

At step 102, frequency hopping is performed based on the frequency hopping offset, the number of frequency hopping, and the frequency hopping time domain granularity.

In an embodiment of the present disclosure, after determining the frequency hopping offset, the number of frequency hopping, and the frequency hopping time domain granularity, the UE may perform the frequency hopping based on the frequency hopping offset, the number of frequency hopping, and the frequency hopping time domain granularity. In an embodiment of the present disclosure, after determining the frequency hopping offset value, frequency hopping frequency, and frequency hopping time domain granularity based on a protocol, the frequency hopping may be performed based on the frequency hopping offset value, frequency hopping frequency, and frequency hopping time domain granularity.

Figure 2:
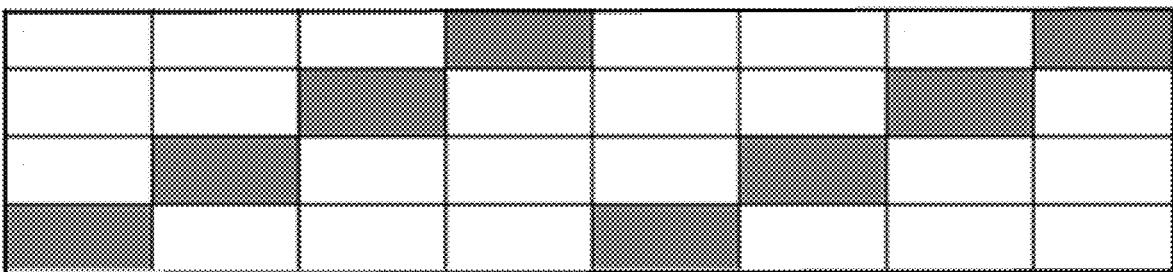
FIG. 2 is a schematic diagram illustrating a frequency hopping mode provided in an embodiment of the present disclosure.

In an embodiment of the present disclosure, the frequency hopping offset is configured to determine a starting position of each hop. The number of frequency hopping may be understood as a number of hops during the frequency hopping. For example, Message3 is repeatedly transmitted 8 times, the frequency hopping time domain granularity is 1 slot, and the number of hops may be 4, then a frequency hopping mode may be shown in FIG. 2. That is, during a repetition process, a transmission of msg3 has 4 different frequency domain positions (as shown in a gray part in FIG. 2). The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, at least one of the frequency hopping offset, the number of frequency hopping, and the frequency hopping time domain granularity is specified by a protocol.

In an embodiment of the present disclosure, one or more tables may be designed, for example, one table may include the frequency hopping offset, the number of frequency hopping, and the frequency hopping time domain granularity, or in three tables, each of which may include one parameter. For example, a first table may include the frequency hopping offset, a second table may include the number of frequency hopping, and the third table may include the frequency hopping time domain granularity. The table may be specified by the protocol, or also be configure for a UE by the base station, such that the UE may acquire the table, and then acquire at least one of the frequency hopping offset, the number of frequency hopping, and the frequency hopping time domain granularity from one or more tables. In addition, the table may also be specified by a communication protocol of communication standardization organization (such as 3GPP (3rd Generation Partnership Project) standardization organization, IEEE (Institute of Electrical and Electronic Engineers), etc.), or pre-configured in a communication device by factory settings of the communication device. In an embodiment, the base station may send a control signal to a terminal as required, and a table to be applied in a current communication is indicated in the control signal, to notify the terminal to activate the table.

It should be noted that different frequency hopping offset configuration tables may be set based on different numbers of hops.

In an embodiment of the present disclosure, a fixed frequency hopping offset is set in the table, and the frequency hopping offset may be determined based on a BWP (bandwidth part) of communication.

In an embodiment of the present disclosure, in a cast that the number of hops is 2, as shown in Table 1, when the BWP is less than 50, corresponding identifiers are 0 or 1, where a frequency hopping offset corresponding to identifier 0 is BWP/2, and a frequency hopping offset corresponding to identifier 1 is BWP/4. When a bandwidth is greater than or equal to 50, corresponding identifiers are 00, 01, 10, and 11, where a frequency hopping offset corresponding to identifier 00 is BWP/2, a frequency hopping offset corresponding to identifier 01 is BWP/4, frequency hopping offset corresponding to identifier 10 is −BWP/4, and identifier 11 represents retaining a frequency hopping offset.

TABLE 1

| Number of PRBs for initial uplink BWP | offset identifier | offset |
|---|---|---|
| BWP < 50 | 0 | BWP/2 |
|  | 1 | BWP/4 |
| BWP ≥ 50 | 00 | BWP/2 |
|  | 01 | BWP/4 |
|  | 10 | −BWP/4 |
|  | 11 | retain |

In an embodiment of the present disclosure, in a case that the number of hops is 3 or more, as shown in Table 2, when the BWP is less than 50, corresponding identifiers are 0 and 1, where a frequency hopping offset corresponding to identifier 0 is BWP/3, and a frequency hopping offset corresponding to identifier 1 is BWP/6. When the BWP is greater than or equal to 50, corresponding identifiers are 00, 01, 10, and 11, where a frequency hopping offset corresponding to identifier 00 is BWP/3, a frequency hopping offset corresponding to identifier 01 is BWP/6, a frequency hopping offset corresponding to identifier 10 is –BWP/6, and identifier 11 represents retaining a frequency hopping offset.

TABLE 2

| Number of PRBs for initial uplink BWP | offset identifier | offset |
|---|---|---|
| BWP < 50 | 0 | BWP/3 |
| | 1 | BWP/6 |
| BWP ≥ 50 | 00 | BWP/3 |
| | 01 | BWP/6 |
| | 10 | –BWP/6 |
| | 11 | retain |

It should be noted that the above table is only illustrative, and multiple entries may be independently applied to technical solutions for different technical purposes. For example, a correspondence relationship between an offset identifier and an offset is not limited to examples in the table. Those skilled in the art may change the correspondence relationship and numerical system according to requirements of an implementation solution. For example, for Table 1 used for two frequency hopping, the offset value may be any value less than or equal to half of a system bandwidth or the bandwidth part. For Table 2 used for three frequency hopping, the offset may be any value less than or equal to one-third of the system bandwidth or the bandwidth part, and the like.

In another embodiment of the present disclosure, the UE may also determine the number of frequency hopping based on the number of repetitions. In an embodiment of the present disclosure, the number of frequency hopping may be generated based on the number of repetitions and the frequency hopping time domain granularity. For example, different combinations of the number of repetitions and the frequency hopping time domain granularity may have a correspondence relationship with the number of frequency hopping, and the correspondence relationship is determined by one or more formulas or tables. The formula or table may be specified through a protocol or configured for the UE by the base station, such that the UE may obtain the formula or table, and then obtain the number of frequency hopping corresponding to a specific combination of the number of repetitions and the frequency hopping time domain granularity from one or more formulas or tables. In addition, the formula or table may also be specified by a protocol or pre-configured in a communication device by factory settings of the communication device. In an embodiment, the base station may send a control signal to a terminal as required, and a formula or table to be applied in a current communication is indicated in the control signal, to notify the terminal to activate the formula or table.

It should be noted that the repetition may be understood as a technique that a same content is sent multiple times and a receiver performs combined decoding on content received multiple times, thus increasing a probability of correct reception of the receiver.

In an embodiment of the present disclosure, after determining the number of repetitions based on channel conditions, the number of frequency hopping may be determined based on a ratio of the number of repetitions to the frequency hopping time domain granularity.

In this embodiment, the frequency hopping offset, the number of frequency hopping, and the frequency hopping time domain granularity are determined first, and then the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

In an embodiment of in the present disclosure, when processing the frequency hopping, the frequency hopping parameters further include a frequency hopping manner, and the frequency hopping further is performed based on the frequency hopping offset, the number of frequency hopping, the frequency hopping time domain granularity, and the frequency hopping manner.

In an embodiment of the present disclosure, the frequency hopping manner includes an intra-slot frequency hopping manner and an inter-slot frequency hopping manner.

Figure 3:
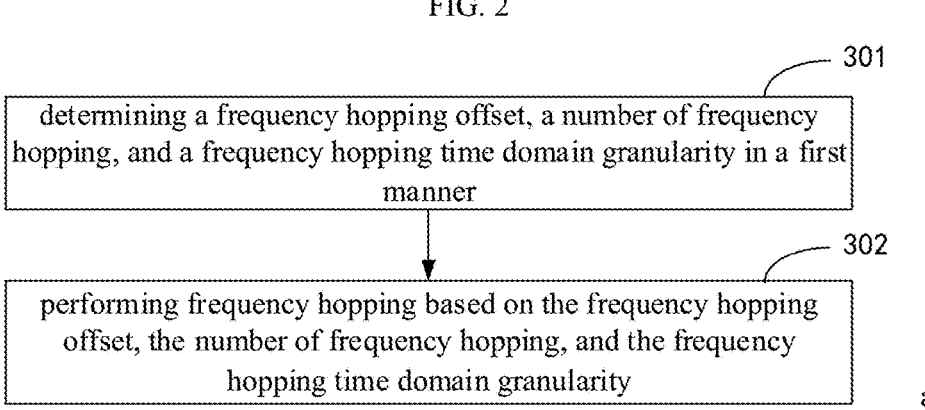
FIG. 3 is a flowchart illustrating another method for controlling frequency hopping provided in an embodiment of the present disclosure.

FIG. 3 is a flowchart illustrating another method for controlling frequency hopping provided in an embodiment of the present disclosure. The method is performed by a UE. As illustrated in FIG. 3, the method for controlling frequency hopping includes the following steps.

At step 301, a frequency hopping offset, a number of frequency hopping, and a frequency hopping time domain granularity are determined in a first manner. The first manner refers to that at least one of the frequency hopping offset, the number of frequency hopping, and the frequency hopping time domain granularity is indicated by a base station.

In an embodiment of the present disclosure, frequency hopping may be understood as a technique of transmitting at different times on different frequencies in communication to cope with frequency selective fading.

In an embodiment of the present disclosure, the frequency hopping offset is configured to determine a starting position of each hop. The number of frequency hopping may be understood as a number of hops during the frequency hopping. For example, Message3 is repeatedly transmitted 8 times, the frequency hopping time domain granularity is 1 slot, and the number of hops may be 4, then a frequency hopping mode may be shown in FIG. 2. That is, during a repetition process, a transmission of Message3 has 4 different frequency domain positions. The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, at least one of the frequency hopping offset, the number of frequency hopping, and the frequency hopping time domain granularity is directly indicated by the base station.

In an embodiment of the present disclosure, one or more of the frequency hopping offset, the number of frequency hopping, and the frequency hopping time domain granularity may be acquired from a first remaining minimum system information (RMSI) by receiving the first RMSI sent by the base station.

In an embodiment of the present disclosure, the base station may send the first remaining minimum system information RMSI to the UE, and the RMSI carries one or more of the frequency hopping offset, the number of frequency hopping, and the frequency hopping time domain granularity. Further, the UE receives the RMSI, and acquires one or more of the frequency hopping offset, the number of frequency hopping, and the frequency hopping time domain granularity for the RMSI. In this embodiments, one or more of the frequency hopping offset, the number of frequency hopping, and the frequency hopping time domain granularity may be carried in the first RMSI, or a frequency hopping manner may also be carried in the first RMSI. One or more of the frequency hopping offset, the number of frequency hopping, and the frequency hopping time domain granularity or the frequency hopping manner may be directly sent to the UE through the first RMSI.

In an embodiment of the present disclosure, one or more of the frequency hopping offset, the number of frequency hopping, and the frequency hopping time domain granularity may be acquired by receiving a RRC massage sent by the base station, but the present disclosure is not limited herein.

In another embodiment of the present disclosure, the number of frequency hopping may be determine based on a number of repetitions. In an embodiment of the present disclosure, the number of frequency hopping may be generated based on the number of repetitions and the frequency hopping time domain granularity, thus the number of frequency hopping is determined. For example, different combinations of the number of repetitions and the frequency hopping time domain granularity may have a correspondence relationship with the number of frequency hopping, and the correspondence relationship is determined by one or more formulas or tables. The formula or table may be specified through a protocol or configured for the UE by the base station, such that the UE may obtain the formula or table, and then obtain the number of frequency hopping corresponding to a specific combination of the number of repetitions and the frequency hopping time domain granularity from one or more formulas or tables. In addition, the formula or table may also be specified by a protocol or pre-configured in a communication device by factory settings of the communication device. In an embodiment, the base station may send a control signal to a terminal as required, and a formula or table to be applied in a current communication is indicated in the control signal, to notify the terminal to activate the formula or table.

It should be noted that the repetition may be understood as a technique that a same content is sent multiple times and a receiver performs combined decoding on content received multiple times, thus increasing a probability of correct reception of the receiver.

In an embodiment of the present disclosure, after determining the number of repetitions based on channel conditions, the number of frequency hopping may be determined based on a ratio of the number of repetitions to the frequency hopping time domain granularity.

In an embodiment of in the present disclosure, when processing the frequency hopping, the frequency hopping parameters further include a frequency hopping manner. In an embodiment of in the present disclosure, after acquiring the frequency hopping manner, the UE may further perform the frequency hopping based on the frequency hopping offset, the number of frequency hopping, the frequency hopping time domain granularity, and the frequency hopping manner.

In an embodiment of the present disclosure, the frequency hopping manner includes an intra-slot frequency hopping manner and an inter-slot frequency hopping manner.

At step 302, frequency hopping is performed based on the frequency hopping offset, the number of frequency hopping, and the frequency hopping time domain granularity.

In an embodiment of the present disclosure, the frequency hopping may be performed based on the frequency hopping offset, the number of frequency hopping, and the frequency hopping time domain granularity after determining the frequency hopping offset, the number of frequency hopping, and the frequency hopping time domain granularity based on an indication of the base station.

In this embodiment, the frequency hopping offset, the number of frequency hopping, and the frequency hopping time domain granularity are determined, and the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

Figure 4:
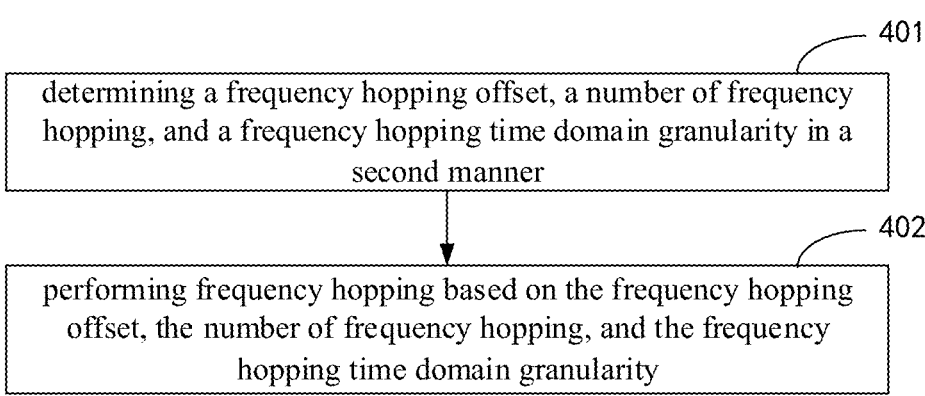
FIG. 4 is a flowchart illustrating another method for controlling frequency hopping provided in an embodiment of the present disclosure.

An embodiment provides another method for controlling frequency hopping. FIG. 4 is a flowchart illustrating another method for controlling frequency hopping provided in an embodiment of the present disclosure. The method is performed by a UE. It should be noted that this embodiment may determine frequency hopping parameters by combining manners of being specified by a protocol and being indicated by a base station.

As illustrated in FIG. 4, the method may include the following steps.

At step 401, a frequency hopping offset, a number of frequency hopping, and a frequency hopping time domain granularity are determined in a second manner. The second manner refers to that the frequency hopping offset, the number of frequency hopping, and the frequency hopping time domain granularity are acquired from g a RAR signaling or a DCI signaling.

In an embodiment of the present disclosure, frequency hopping may be understood as a technique of transmitting at different times on different frequencies in communication to cope with frequency selective fading.

In an embodiment of the present disclosure, the frequency hopping offset is configured to determine a starting position of each hop. The number of frequency hopping may be understood as a number of hops during the frequency hopping. For example, Message3 is repeatedly transmitted 8 times, the frequency hopping time domain granularity is 1 slot, and the number of hops may be 4, then a frequency hopping mode may be shown in FIG. 2. That is, during a repetition process, a transmission of msg3 has 4 different frequency domain positions (as shown in a gray part in FIG. 2). The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, a random access response (RAR) signaling or a downlink control information (DCI) signaling is acquired, and a first offset identifier is acquired from the RAR signaling or the DCI signaling. Then, the frequency hopping offset is determined by querying a frequency hopping offset configuration table based on the first offset identifier. In an embodiment of the present disclosure, the above first offset identifier may be an index value configured to obtain through indexing the corresponding frequency hopping offset from the frequency hopping offset configuration table.

In an embodiment of the present disclosure, an uplink scheduling grant (UL Grant) of the RAR signaling carries the first offset identifier.

In an embodiment of the present disclosure, the frequency hopping offset configuration table is specified by a protocol or indicated by a signaling of the base station.

In an embodiment of the present disclosure, the base station may send the RAR signaling or the downlink control information DCI signaling carrying the first offset identifier to the UE, and then the user equipment UE may receive the RAR signaling or the downlink control information DCI signaling carrying the first offset identifier sent by the base station, and acquire the first offset identifier from the RAR signaling or the downlink control information DCI signaling received, and then determine the frequency hopping offset by querying the frequency hopping offset configuration table based on the first offset identifier.

In an embodiment of the present disclosure, the corresponding frequency hopping offset configuration table may be determined based on different numbers of hops. One or more frequency hopping offset configuration table may be provided.

When a plurality of frequency hopping offset configuration tables are provided, each frequency hopping offset configuration table corresponds to one number of frequency hopping. Accordingly, the corresponding frequency hopping offset configuration table may be determined based on the number of frequency hopping, and then the frequency hopping offset is determined based on the frequency hopping offset configuration table.

When one frequency hopping offset configuration table is provided, each number of frequency hopping in the frequency hopping offset configuration table corresponds to one index value. In an embodiment of the present disclosure, the base station may send the first offset identifier to the UE, and the first offset identifier may be the index value. The UE search for the corresponding number of frequency hopping the frequency hopping offset configuration table based on the first offset identifier.

It should be noted that when different numbers of frequency hopping are used in a same table, multiple rows of the table may correspond to a same number of hops or different numbers of hops.

In an embodiment of the present disclosure, a plurality of frequency hopping offset configuration tables may be summarized into a large table, and then the first offset identifier may be determined as the index value for searching. Since the plurality of frequency hopping offset configuration tables is summarized into the large table, resulting in the longer large table, an extended bit is required for representation. The extended bits may multiplex a TPC (power control) field in a RAR UL grant.

In an embodiment of the present disclosure, when repetition is required, coverage is poor, and the terminal generally transmits by using full power. At this point, the TPC (power control) field is invalid, therefore, the TPC field may be multiplexed as the extended bit (i.e. the first offset identifier).

In an embodiment of the present disclosure, the RAR signaling or the DCI signaling sent by the base station may be acquired, and the first number of frequency hopping identifier may be acquired from the RAR signaling or the DCI signaling. Then, the number of frequency hopping is determined by querying a number of frequency hopping configuration table based on the first number of frequency hopping identifier.

In an embodiment of the present disclosure, the base station may send the RAR signaling or the DCI signaling carrying the first number of frequency hopping identifier to the UE, and then the UE may receive the RAR signaling or the DCI signaling carrying the first number of frequency hopping identifier sent by the base station, and acquire the first number of frequency hopping identifier from the RAR signaling or the DCI signaling received, and then determine the number of frequency hopping by querying the frequency hopping offset configuration table based on the first number of frequency hopping identifier. In an embodiment of the present disclosure, the first number of frequency hopping identifier may be an index value configured to query the frequency hopping offset configuration table. In this embodiment, the frequency hopping offset configuration table may be specified by a protocol or indicated by the base station.

In an embodiment of the present disclosure, a RAR signaling or a DCI signaling sent by a base station is acquired, and a first frequency hopping time domain granularity identifier is acquired from the RAR signaling or the DCI signaling. The frequency hopping time domain granularity is determined by querying a frequency hopping time domain granularity configuration table based on the first frequency hopping time domain granularity identifier. In an embodiment of the present disclosure, the first frequency hopping time domain granularity identifier may be an index value configured to query the frequency hopping time domain granularity configuration table. In this embodiment, the frequency hopping time domain granularity configuration table may be specified by a protocol or indicated by the base station.

In an embodiment of the present disclosure, the frequency hopping offset configuration table, the number of frequency hopping configuration table, or the frequency hopping time domain granularity configuration table is specified by a protocol or indicated by a signaling.

In an embodiment of the present disclosure, the base station may send the RAR signaling or the DCI signaling carrying the first frequency hopping time domain granularity identifier to the UE, and then the UE may receive the RAR signaling or the DCI signaling carrying the first frequency hopping time domain granularity identifier sent by the base station, and acquire the first frequency hopping time domain granularity identifier from the RAR signaling or the DCI signaling received, and then determine the number of frequency hopping by querying the frequency hopping offset configuration table based on the first frequency hopping time domain granularity identifier.

In an embodiment of in the present disclosure, when processing the frequency hopping, the frequency hopping parameters further include a frequency hopping manner, and the frequency hopping may be further performed based on the frequency hopping offset, the number of frequency hopping, the frequency hopping time domain granularity, and the frequency hopping manner.

In an embodiment of the present disclosure, the frequency hopping manner includes an intra-slot frequency hopping manner and an inter-slot frequency hopping manner.

At step 402, frequency hopping is performed based on the frequency hopping offset, the number of frequency hopping, and the frequency hopping time domain granularity.

In an embodiment of the present disclosure, the UE receives the RAR signaling or the DCI signaling sent by the base station, one or more of the first frequency hopping offset identifier, the first number of frequency hopping identifier, and the first frequency hopping time domain granularity identifier are acquired from the RAR signaling or DCI signaling, and the frequency hopping may be performed based on the frequency hopping offset, the number of frequency hopping, and the frequency hopping time domain granularity after determining the frequency hopping offset, the number of frequency hopping, and the frequency hopping time domain granularity based on one or more of the first frequency hopping offset identifier, the first number of frequency hopping identifier, and the first frequency hopping time domain granularity identifier.

In this embodiment, the frequency hopping offset, the number of frequency hopping, and the frequency hopping time domain granularity are determined, and the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

Figure 5:
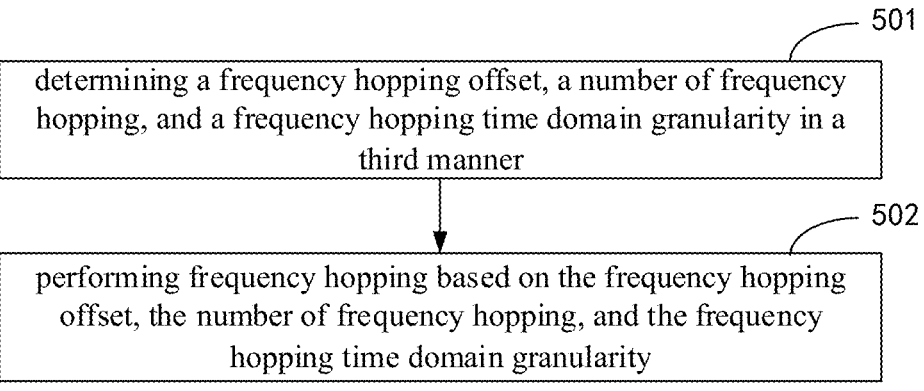
FIG. 5 is a flowchart illustrating another method for controlling frequency hopping provided in an embodiment of the present disclosure.

An embodiment provides another method for controlling frequency hopping. FIG. 5 is a flowchart illustrating another method for controlling frequency hopping provided in an embodiment of the present disclosure. The method is performed by a UE. It should be noted that this embodiment may determine frequency hopping parameters by means of querying a table through the UE.

As illustrated in FIG. 5, the method may include the following steps.

At step 501, a frequency hopping offset, a number of frequency hopping, and a frequency hopping time domain granularity are determined in a third manner. The second third refers to first acquiring a corresponding configuration table from a base station, and then acquiring a corresponding index to determine the frequency hopping offset, the number of frequency hopping, the frequency hopping time domain granularity. In an embodiment of the present disclosure, frequency hopping may be understood as a technique of transmitting at different times on different frequencies in communication to cope with frequency selective fading.

In an embodiment of the present disclosure, the frequency hopping offset may be understood as a starting position of each hop. The number of frequency hopping may be understood as a number of hops during the frequency hopping. For example, once frequency hopping is 1hop, and twice frequency hopping is 2hop, which is a number of times that the communication frequency changes within a cycle of frequency hopping. The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, a second RMSI sent by the base station may be acquired, and a frequency hopping offset configuration table may be acquired from the second RMSI. A RAR signaling or a DCI signaling sent by the base station may be acquired, and a second offset identifier may be acquired from the RAR signaling or the DCI signaling. Then, the frequency hopping offset is determined by querying the frequency hopping offset configuration table based on the second offset identifier.

In an embodiment of the present disclosure, the frequency hopping offset configuration table is specified by a protocol or indicated by a signaling.

In an embodiment of the present disclosure, the base station may send the second RMSI, and the RAR signaling or the DCI signaling to the UE, and then the UE may receive the second RMSI, and the RAR signaling or the DCI signaling sent by the base station, and acquire the frequency hopping offset configuration table from the second RMSI, and acquire the second offset identifier from the RAR signaling or the DCI signaling, and then determine the frequency hopping offset by querying the frequency hopping offset configuration table based on the second offset identifier.

It should be noted that the corresponding frequency hopping offset configuration table may be determined based on different numbers of hops. One or more frequency hopping offset configuration table may be provided.

When a plurality of frequency hopping offset configuration tables are provided, each frequency hopping offset configuration table corresponds to one number of frequency hopping. Accordingly, the corresponding frequency hopping offset configuration table may be determined based on the number of frequency hopping, and then the frequency hopping offset is determined based on the frequency hopping offset configuration table.

When one frequency hopping offset configuration table is provided, each number of frequency hopping in the frequency hopping offset configuration table corresponds to one index value. Accordingly, the second offset identifier may be an index value.

It should be noted that when different numbers of frequency hopping are used in a same table, multiple rows of the table may correspond to a same number of hops or different numbers of hops.

In an embodiment of the present disclosure, a plurality of frequency hopping offset configuration tables may be summarized into a large table, and the second offset identifier may be determined as the index value. Since the plurality of frequency hopping offset configuration tables is summarized into the large table, resulting in the longer large table, an extended bit is required for representation.

In an embodiment of the present disclosure, the plurality of frequency hopping offset configuration tables may be summarized into the large table, and then the second offset identifier may be determined as the index value for searching. Since the plurality of frequency hopping offset configuration tables is summarized into the large table, resulting in the longer large table, the extended bit is required for representation. The extended bits may multiplex a TPC (power control) field in a RAR UL grant.

In an embodiment of the present disclosure, when repetition is required, coverage is poor, and the terminal generally transmits by using full power. At this point, the TPC (power control) field is invalid, therefore, the TPC field may be multiplexed as the extended bit (i.e. the second offset identifier).

In an embodiment of the present disclosure, a third RMSI sent by the base station is acquired, and a number of frequency hopping configuration table is acquired from the third RMSI. A RAR signaling or a DCI signaling sent by the base station is acquired, and a second number of frequency hopping identifier is acquired from the RAR signaling or the DCI signaling, and then the number of frequency hopping is determined by querying the number of frequency hopping configuration table based on the second number of frequency hopping identifier.

In an embodiment of the present disclosure, the base station may send the third RMSI, and the RAR signaling or the DCI signaling to the UE, and then the UE may receive the third RMSI, and the RAR signaling or the DCI signaling sent by the base station, and acquire the number of frequency hopping configuration table from the third RMSI, and acquire the second number of frequency hopping identifier from the RAR signaling or the DCI signaling, and then determine the number of frequency hopping by querying the number of frequency hopping configuration table based on the second number of frequency hopping identifier.

In an embodiment of the present disclosure, a fourth RMSI sent by the base station is acquired, and a frequency hopping time domain granularity configuration table is acquired from the fourth RMSI. A RAR signaling or a DCI signaling sent by the base station is acquired, and a second frequency hopping time domain granularity identifier is acquired from the RAR signaling or the DCI signaling. Then, the frequency hopping time domain granularity is determined by querying the frequency hopping time domain granularity configuration table based on the second frequency hopping time domain granularity identifier.

In an embodiment of the present disclosure, the base station may send the fourth RMSI, and the RAR signaling or the DCI signaling to the UE, and then the UE may receive the fourth RMSI, and the RAR signaling or the DCI signaling sent by the base station, and acquire the frequency hopping time domain granularity configuration table from the fourth RMSI, and acquire the second frequency hopping time domain granularity identifier from the RAR signaling or the DCI signaling, and then determine the frequency hopping time domain granularity by querying the frequency hopping time domain granularity configuration table based on the second frequency hopping time domain granularity identifier.

In an embodiment of in the present disclosure, when processing the frequency hopping, the frequency hopping parameters further include a frequency hopping manner, and the frequency hopping may be further performed based on the frequency hopping offset, the number of frequency hopping, the frequency hopping time domain granularity, and the frequency hopping manner.

In an embodiment of the present disclosure, the frequency hopping manner includes an intra-slot frequency hopping manner and an inter-slot frequency hopping manner.

At step 502, frequency hopping is performed based on the frequency hopping offset, the number of frequency hopping, and the frequency hopping time domain granularity.

In an embodiment of the present disclosure, the frequency hopping may be performed based on the frequency hopping offset, the number of frequency hopping, and the frequency hopping time domain granularity after determining the frequency hopping offset, the number of frequency hopping, and the frequency hopping time domain granularity based on a manner of querying the table through the UE.

In this embodiment, the frequency hopping offset, the number of frequency hopping, and the frequency hopping time domain granularity are determined, and the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

Figure 6:
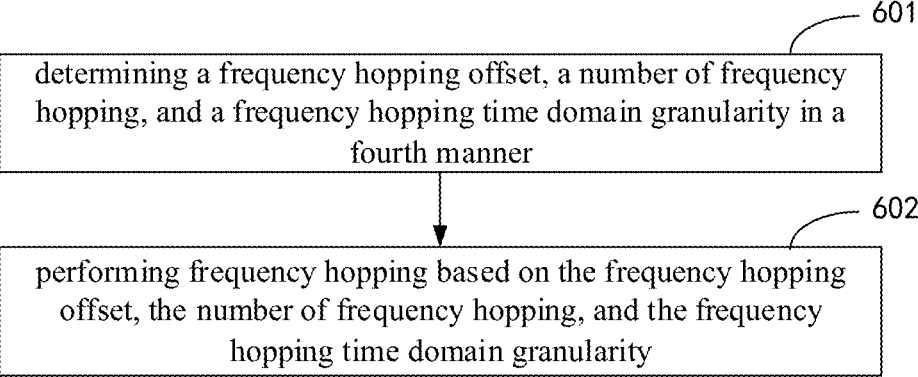
FIG. 6 is a flowchart illustrating another method for controlling frequency hopping provided in an embodiment of the present disclosure.

An embodiment provides another method for controlling frequency hopping. FIG. 6 is a flowchart illustrating another method for controlling frequency hopping provided in an embodiment of the present disclosure. The method is performed by a UE. It should be noted that this embodiment may determine frequency hopping parameters by means of being indicated by a base station.

As illustrated in FIG. 6, the method may include the following steps.

At step 601, a frequency hopping offset, a number of frequency hopping, and a frequency hopping time domain granularity are determined in a fourth manner. In an embodiment of the present disclosure, the fourth manner refers to a manner of being indicated by the base station.

In an embodiment of the present disclosure, frequency hopping may be understood as a technique of transmitting at different times on different frequencies in communication to cope with frequency selective fading.

In an embodiment of the present disclosure, the frequency hopping offset may be understood as a starting position of each hop. The number of frequency hopping may be understood as a number of hops during the frequency hopping. For example, once frequency hopping is 1hop, and twice frequency hopping is 2hop, which is a number of times that the communication frequency changes within a cycle of frequency hopping. The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, one or more of the frequency hopping offset, the number of frequency hopping, and the frequency hopping time domain granularity are indicated by following messages: one or more of scheduling information of Message2 and retransmission scheduling information of Message2 and Message3.

Specifically, the base station may indicate one or more of the frequency hopping offset, the number of frequency hopping, and the frequency hopping time domain granularity through one or more of the scheduling information of Message2 and the retransmission scheduling information of Message2 and Message3. For example, the base station may indicate the frequency hopping offset through the scheduling information of Message2, and indicate the number of frequency hopping and the frequency hopping time domain granularity through the retransmission scheduling information of Message3. For another example, the base station may indicate the frequency hopping offset and the number of frequency hopping through the retransmission scheduling information of Message2, and indicate the frequency hopping time domain granularity through the retransmission scheduling information of Message3. For another example, the base station may indicate the frequency hopping offset, the number of frequency hopping, and the frequency hopping time domain granularity through the retransmission scheduling information of Message2. For another example, the base station may indicate the frequency hopping offset, the number of frequency hopping, and the frequency hopping time domain granularity through the retransmission scheduling information of Message3.

In an embodiment of the present disclosure, the frequency hopping offset, the number of frequency hopping, and the frequency hopping time domain granularity may be indicated by a same signaling (Message2 or Message3). In another embodiment of the present disclosure, the retransmission scheduling information of Message3 may only indicate frequency hopping parameters during retransmission of Message3, while the scheduling information of Message2 and the retransmission scheduling information of Message2 may indicate both frequency hopping parameters of an initial transmission and frequency hopping parameters of a retransmission transmission.

In an embodiment of the present disclosure, the frequency hopping parameters may further include a frequency hopping manner. A repetition content may be acquired, and the frequency hopping manner corresponding to the repetition content is determined based on the repetition content.

In an embodiment of the present disclosure, the frequency hopping manner includes an intra-slot frequency hopping manner and an inter-slot frequency hopping manner.

In an embodiment of the present disclosure, the frequency hopping manner is indicated by a RMSI, or by one or more of the scheduling information of Message2 and the retransmission scheduling information of Message2 and Message3. The specific process may be reference to the above indication process of the frequency hopping offset, the number of frequency hopping, and the frequency hopping time domain granularity.

In an embodiment disclosed in the present disclosure, the base station may send RMSI to the UE, wherein the RMSI carries a frequency hopping manner, and the UE may receive the RMSI sent by the base station and acquire the frequency hopping manner from the RMSI. In an embodiment of the present disclosure, the base station may indicate the frequency hopping manner through the scheduling information of Message2, the retransmission scheduling information of Message2, or the retransmission scheduling information of Message3.

At step 602, frequency hopping is performed based on the frequency hopping offset, the number of frequency hopping, and the frequency hopping time domain granularity.

In an embodiment of the present disclosure, the frequency hopping may be performed based on the frequency hopping offset, the number of frequency hopping, and the frequency hopping time domain granularity after determining the frequency hopping offset, the number of frequency hopping, and the frequency hopping time domain granularity based on a manner of indicating by the base station through the RMSI, and one or more of the scheduling information of Message2 and the retransmission scheduling information of Message2 and Message3.

In this embodiment, the frequency hopping offset, the number of frequency hopping, and the frequency hopping time domain granularity are determined, and the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

An embodiment provides another method for controlling frequency hopping. FIG. 7 is a flowchart illustrating another method for controlling frequency hopping provided in an embodiment of the present disclosure. The method is performed by a base station. It should be noted that this embodiment may send indication information to a UE by the base station to enable the UE to perform frequency hopping based on the received indication information sent by the base station.

As illustrated in FIG. 7, the method may include the following steps.

At step 701, indication information is sent to a UE, in which, the indication information is configured to indicate the UE to determine one or more of a frequency hopping offset, a number of frequency hopping, and a frequency hopping time domain granularity.

In an embodiment of the present disclosure, frequency hopping may be understood as a technique of transmitting at different times on different frequencies in communication to cope with frequency selective fading.

In an embodiment of the present disclosure, the frequency hopping offset is configured to determine a starting position of each hop. The number of frequency hopping may be understood as a number of hops during the frequency hopping. For example, Message3 is repeatedly transmitted 8 times, the frequency hopping time domain granularity is 1 slot, and the number of hops may be 4, then a frequency hopping mode may be shown in FIG. 2. That is, during a repetition process, a transmission of Message3 has 4 different frequency domain positions. The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, the base station may send a RAR signaling or a DCI signaling to the UE. After receiving the RAR signaling or the DCI signaling sent by the base station, the UE may determine the frequency hopping offset, the number of frequency hopping, and the frequency hopping time domain granularity from the RAR signaling or the DCI signaling.

In an embodiment of the present disclosure, the base station sends the RAR signaling or the DCI signaling to the UE, in which the RAR signaling or the DCI signaling includes a first offset identifier. In an embodiment of the present disclosure, a UL Grant of the RAR signaling carries the first offset identifier. After receiving the RAR signaling or the DCI signaling sent by the base station, the UE may determine the first offset identifier from the RAR signaling or the DCI signaling, and determine the frequency hopping offset based on the first offset identifier.

In an embodiment of the present disclosure, the base station sends the RAR signaling or the DCI signaling to the UE, in which the RAR signaling or the DCI signaling includes a first number of frequency hopping identifier. After receiving the RAR signaling or the DCI signaling sent by the base station, the UE may determine the first number of frequency hopping identifier from the RAR signaling or the DCI signaling, and determine the number of frequency hopping based on the first number of frequency hopping identifier.

In an embodiment of the present disclosure, the base station sends the RAR signaling or the DCI signaling to the UE, in which the RAR signaling or the DCI signaling includes a first frequency hopping time domain granularity identifier. After receiving the RAR signaling or the DCI signaling sent by the base station, the UE may determine the first frequency hopping time domain granularity identifier from the RAR signaling or the DCI signaling, and determine the frequency hopping time domain granularity based on the first frequency hopping time domain granularity identifier.

In an embodiment of the present disclosure, one or more of the frequency hopping offset configuration table, the number of frequency hopping configuration table, or the frequency hopping time domain granularity configuration table is specified by a protocol or indicated by a signaling sent by the base station.

In an embodiment of the present disclosure, a first RMSI may be sent to the UE, in which the first RMSI includes one or more of the frequency hopping offset, the number of frequency hopping, and the frequency hopping time domain granularity. Thus, the UE receives the first RMSI, and determines one or more of the frequency hopping offset, the number of frequency hopping, and the frequency hopping time domain granularity from the first RMSI.

In an embodiment of the present disclosure, the base station may send a second RMSI to the UE, in which the second RMSI includes a frequency hopping parameter configuration table; and send a RAR signaling or a DCI signaling to the UE, in which the RAR signaling or the DCI signaling includes a parameter identifier. Thus, the UE receives the second RMSI, and the RAR signaling or the DCI signaling, and searches for frequency hopping parameters from the parameter configuration table based on the parameter identifier.

In an embodiment of the present disclosure, the base station may send a second RMSI to the UE, in which the second RMSI includes a frequency hopping offset configuration table; and send a RAR signaling or a DCI signaling to the UE, in which the RAR signaling or the DCI signaling includes a second offset identifier. Thus, after receiving the second RMSI, the UE determines the frequency hopping offset configuration table from the second RMSI, and determines the second offset identifier from the RAR signaling or the DCI signaling, such that the offset is determined from the frequency hopping offset configuration table based on the second offset identifier.

In an embodiment of the present disclosure, the base station sends a third RMSI to the UE, in which the third RMSI includes a number of frequency hopping configuration table; and sends a RAR signaling or a DCI signaling to the UE, in which the RAR signaling or the DCI signaling includes a second number of frequency hopping identifier. Thus, after receiving the third RMSI, the UE determines the number of frequency hopping configuration table from the third RMSI, and determines the number of frequency hopping identifier from the RAR signaling or the DCI signaling, such that the number of frequency hopping is determined from the number of frequency hopping configuration table based on the number of frequency hopping identifier.

In an embodiment of the present disclosure, the base station sends a fourth RMSI to the UE, in which the fourth RMSI includes a frequency hopping time domain granularity configuration table; and sends a RAR signaling or a DCI signaling to the UE, in which the RAR signaling or the DCI signaling includes a second frequency hopping time domain granularity identifier. Thus, after receiving the fourth RMSI, the UE determines the frequency hopping time domain granularity configuration table from the fourth RMSI, and determines the second frequency hopping time domain granularity identifier from the RAR signaling or the DCI signaling, such that the second frequency hopping time domain granularity is determined from the frequency hopping time domain granularity configuration table.

In an embodiment of the present disclosure, the above RAR signaling or DCI signaling may be one or more of scheduling information of Message2 and retransmission scheduling information of Message2 and Message3. For example, the RAR signaling may be Message2, while the DCI signaling may be the scheduling information of Message2, such as DCI format 1_0, the DCI signaling may also be the retransmission scheduling information of Message3, such as DCI format 0_0, etc. The above examples are only illustrative, and there is no limitation on the RAR signaling or the DCI signaling herein.

In an embodiment of the present disclosure, the corresponding frequency hopping offset configuration table may be determined based on different numbers of hops. One or more frequency hopping offset configuration table may be provided.

When a plurality of frequency hopping offset configuration tables are provided, each frequency hopping offset configuration table corresponds to one number of frequency hopping. Accordingly, the corresponding frequency hopping offset configuration table may be determined based on the number of frequency hopping, and then the frequency hopping offset is determined based on the frequency hopping offset configuration table.

When one frequency hopping offset configuration table is provided, each number of frequency hopping in the frequency hopping offset configuration table corresponds to one index value. Accordingly, the first offset identifier and the second offset identifier are the index values.

It should be noted that when different numbers of frequency hopping are used in a same table, multiple rows of the table may correspond to a same number of hops or different numbers of hops.

In an embodiment of the present disclosure, a plurality of frequency hopping offset configuration tables may be summarized into a large table, and then the second offset identifier may be determined as the index value for searching. Since the plurality of frequency hopping offset configuration tables is summarized into the large table, resulting in the longer large table, an extended bit is required for representation. The extended bits may multiplex a TPC (power control) field in a RAR UL grant.

In an embodiment of the present disclosure, when repetition is required, coverage is poor, and the terminal generally transmits by using full power. At this point, the TPC (power control) field is invalid, therefore, the TPC field may be multiplexed as the extended bit (i.e. the second offset identifier).

In this embodiment, the indication information is sent to the UE, and the indication information is configured to indicate the UE to determine one or more of the frequency hopping offset, the number of frequency hopping, and the frequency hopping time domain granularity. Therefore, the UE may achieve the frequency hopping.

An embodiment provides another method for controlling frequency hopping. FIG. 8 is a flowchart illustrating another method for controlling frequency hopping provided in an embodiment of the present disclosure. The method is performed by a base station. It should be noted that this embodiment may send indication information to a UE by the base station to enable the UE to perform frequency hopping based on the received indication information sent by the base station.

As illustrated in FIG. 8, the method may include the following steps.

At step 801, a frequency hopping offset, a number of frequency hopping, and a frequency hopping time domain granularity corresponding to a UE is determined.

In an embodiment of the present disclosure, frequency hopping may be understood as a technique of transmitting at different times on different frequencies in communication to cope with frequency selective fading.

In an embodiment of the present disclosure, the frequency hopping offset may be understood as a starting position of each hop. The number of frequency hopping may be understood as a number of hops during the frequency hopping. For example, once frequency hopping is 1hop, and twice frequency hopping is 2hop, which is a number of times that the communication frequency changes within a cycle of frequency hopping. The frequency hopping time domain granularity may be understood as an interval of the frequency hopping, which is a duration of the frequency hopping within a time domain range. For example, one cycle of frequency hopping includes 2 slots, or one cycle of frequency hopping includes 5 slots.

In an embodiment of the present disclosure, at least one of the frequency hopping offset, the number of frequency hopping, and the frequency hopping time domain granularity is specified by a protocol.

In an embodiment of the present disclosure, a number of repetitions corresponding to the UE is acquired, and the number of frequency hopping is generated based on the number of repetitions and the frequency hopping time domain granularity. For example, different combinations of the number of repetitions and the frequency hopping time domain granularity may have a correspondence relationship with the number of frequency hopping, which is determined by one or more formulas or tables. The formula or table may be specified by a protocol or configured for a UE by the base station, such that the UE may acquire the formula or table, and then acquire the number of frequency hopping corresponding to a specific combination of number of repetitions and frequency hopping time domain granularity from the one or more formulas or tables. In addition, the formula or table may also be specified by a protocol or pre-configured in a communication device by factory settings of the communication device. In an embodiment, the base station may send a control signal to a terminal as required, and a formula or table to be applied in a current communication is indicated in the control signal, to notify the terminal to activate the formula or table.

In an embodiment of the present disclosure, the number of frequency hopping corresponding to the UE is acquired, and a frequency hopping offset configuration table corresponding to the UE is determined based on the number of frequency hopping; and the frequency hopping offset corresponding to the UE is determined based on the frequency hopping offset configuration table.

The frequency hopping parameters in the UE include a frequency hopping manner. In an embodiment of the present disclosure, the base station may determine a frequency hopping manner corresponding to the UE. A repetition content corresponding to the UE may be acquired, and the frequency hopping manner corresponding to the repetition content may be determined based on the repetition content.

At step 802, a frequency hopping service is provided for the UE according to the frequency hopping offset, the number of frequency hopping, and the frequency hopping time domain granularity corresponding to the UE.

In an embodiment of the present disclosure, the frequency hopping offset, the number of frequency hopping, and the frequency hopping time domain granularity corresponding to the UE are determined, and the frequency hopping service may be provided for the UE according to the frequency hopping offset, the number of frequency hopping, and the frequency hopping time domain granularity corresponding to the UE.

In an embodiment of the present disclosure, the above manners may be used in combination. For example, one or more of the frequency hopping offset, the number of frequency hopping, the frequency hopping time domain granularity, and frequency hopping manner can be obtained by means of the first manner, while others may be obtained by means of one or more of the second manner to the fourth manner. Even, the frequency hopping offset, the number of frequency hopping, the frequency hopping time domain granularity, and frequency hopping manner may be determined in different manner respectively. Of course, in an embodiment of the present disclosure, one or more of the frequency hopping offset, the number of frequency hopping, the frequency hopping time domain granularity, and frequency hopping manner may also be set as default values specified in the protocol.

In this embodiment, with determining the frequency hopping offset, the number of frequency hopping, and the frequency hopping time domain granularity corresponding to the UE, the frequency hopping service may be provided for the UE according to the frequency hopping offset, the number of frequency hopping, and the frequency hopping time domain granularity corresponding to the UE. Thus, the UE may achieve the frequency hopping.

Figure 10:
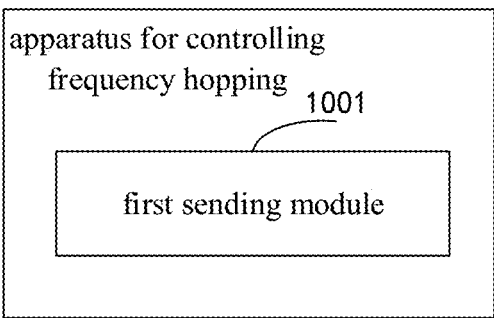
FIG. 10 is a schematic diagram illustrating a structure of another apparatus for controlling frequency hopping provided in an embodiment of the present disclosure.
Figure 11:
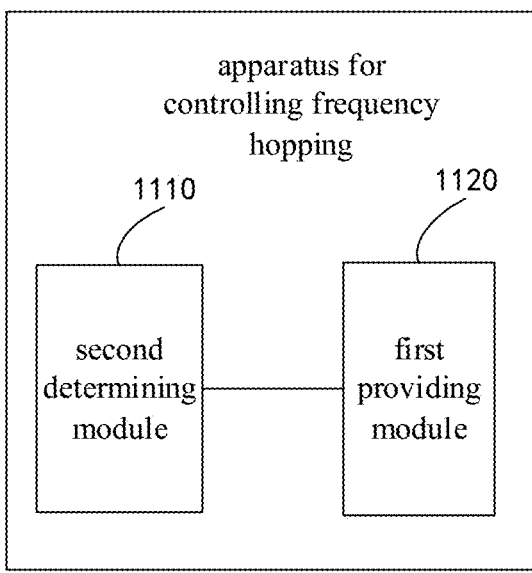
FIG. 11 is a schematic diagram illustrating a structure of yet another apparatus for controlling frequency hopping provided in an embodiment of the present disclosure.

Corresponding to the method for controlling frequency hopping provided by the aforementioned embodiments, the disclosure also provides an apparatus for controlling frequency hopping. As the apparatus for controlling frequency hopping provided by embodiments of the present disclosure corresponds to the method for controlling frequency hopping provided by the aforementioned embodiments, implementations of the method for controlling frequency hopping are also applicable for the apparatus for controlling frequency hopping provided by this embodiment, and will not be described in detail in this embodiment. FIGS. 9-11 are a schematic diagram of a structure of an apparatus for controlling frequency hopping provided in the present disclosure.

FIG. 9 is a schematic diagram illustrating a structure of an apparatus for controlling frequency hopping provided in an embodiment of the present disclosure. The apparatus is performed by a user equipment (UE).

As illustrated tin FIG. 9, the apparatus for controlling frequency hopping includes a first determining module 901 and a first processing module 902.

The first determining module 901 is configured to determine a frequency hopping offset, a number of frequency hopping, and a frequency hopping time domain granularity.

The first processing module 902 is configured to perform frequency hopping based on the frequency hopping offset, the number of frequency hopping, and the frequency hopping time domain granularity.

In an embodiment of the present disclosure, at least one of the frequency hopping offset, the number of frequency hopping, and the frequency hopping time domain granularity is specified by a protocol.

In an embodiment of the present disclosure, at least one of the frequency hopping offset, the number of frequency hopping, and the frequency hopping time domain granularity is indicated by a base station.

In an embodiment of the present disclosure, one or more of the frequency hopping offset, the number of frequency hopping, and the frequency hopping time domain granularity may be acquired from a first remaining minimum system information (RMSI) by receiving the first RMSI sent by the base station.

In an embodiment of the present disclosure, the base station may send the first remaining minimum system information RMSI to the UE, and the RMSI carries one or more of the frequency hopping offset, the number of frequency hopping, and the frequency hopping time domain granularity. Further, the UE receives the RMSI, and acquires one or more of the frequency hopping offset, the number of frequency hopping, and the frequency hopping time domain granularity for the RMSI. In this embodiments, one or more of the frequency hopping offset, the number of frequency hopping, and the frequency hopping time domain granularity may be carried in the first RMSI, or a frequency hopping manner may also be carried in the first RMSI. One or more of the frequency hopping offset, the number of frequency hopping, and the frequency hopping time domain granularity or the frequency hopping manner may be directly sent to the UE through the first RMSI. In an embodiment of the present disclosure, the first determining module 901 includes: a first offset identifier acquiring unit, configured to acquire a random access response (RAR) signaling or a downlink control information (DCI) signaling sent by a base station, and acquire a first offset identifier from the RAR signaling or the DCI signaling; and a first frequency hopping offset determining unit, configured to determine the frequency hopping offset by querying a frequency hopping offset configuration table based on the first offset identifier. In an embodiment of the present disclosure, the above first offset identifier may be an index value configured to obtain through indexing the corresponding frequency hopping offset from the frequency hopping offset configuration table.

In an embodiment of the present disclosure, the corresponding frequency hopping offset configuration table may be determined based on different numbers of hops. One or more frequency hopping offset configuration table may be provided.

When a plurality of frequency hopping offset configuration tables are provided, each frequency hopping offset configuration table corresponds to one number of frequency hopping. Accordingly, the corresponding frequency hopping offset configuration table may be determined based on the number of frequency hopping, and then the frequency hopping offset is determined based on the frequency hopping offset configuration table.

When one frequency hopping offset configuration table is provided, each number of frequency hopping in the frequency hopping offset configuration table corresponds to one index value. In an embodiment of the present disclosure, the base station may send the first offset identifier to the UE, and the first offset identifier may be the index value. The UE search for the corresponding number of frequency hopping the frequency hopping offset configuration table based on the first offset identifier.

It should be noted that when different numbers of frequency hopping are used in a same table, multiple rows of the table may correspond to a same number of hops or different numbers of hops.

In an embodiment of the present disclosure, a plurality of frequency hopping offset configuration tables may be summarized into a large table, and then the first offset identifier may be determined as the index value for searching. Since the plurality of frequency hopping offset configuration tables is summarized into the large table, resulting in the longer large table, an extended bit is required for representation. The extended bits may multiplex a TPC (power control) field in a RAR UL grant.

In an embodiment of the present disclosure, when repetition is required, coverage is poor, and the terminal generally transmits by using full power. At this point, the TPC (power control) field is invalid, therefore, the TPC field may be multiplexed as the extended bit (i.e. the first offset identifier)
.

In an embodiment of the present disclosure, an uplink scheduling grant (UL Grant) of the RAR signaling carries the first offset identifier.

In an embodiment of the present disclosure, the frequency hopping offset configuration table is specified by a protocol or indicated by a signaling.

In an embodiment of the present disclosure, the first determining module 901 includes: a first number of repetitions acquiring unit, configured to acquire a number of repetitions; and a first number of frequency hopping generating unit, configured to generate the number of frequency hopping based on the number of repetitions and the frequency hopping time domain granularity. For example, different combinations of the number of repetitions and the frequency hopping time domain granularity may have a correspondence relationship with the number of frequency hopping, which is determined by one or more formulas or tables. The formula or table may be specified by a protocol or configured for a UE by the base station, such that the UE may acquire the formula or table, and then acquire the number of frequency hopping corresponding to a specific combination of number of repetitions and frequency hopping time domain granularity from the one or more formulas or tables. In addition, the formula or table may also be specified by a protocol or pre-configured in a communication device by factory settings of the communication device. In an embodiment, the base station may send a control signal to a terminal as required, and a formula or table to be applied in a current communication is indicated in the control signal, to notify the terminal to activate the formula or table.

In an embodiment of the present disclosure, the first determining module 901 includes: a first number of frequency hopping identifier acquiring unit, configured to acquire the RAR signaling or the DCI signaling sent by a base station, and acquire a first number of frequency hopping identifier from the RAR signaling or the DCI signaling; and a first number of frequency hopping determining unit, configured to determine the number of frequency hopping by querying a number of frequency hopping configuration table based on the first number of frequency hopping identifier. In an embodiment of the present disclosure, the first number of frequency hopping identifier may be an index configured to query the frequency hopping offset configuration table. In this embodiment, the frequency hopping offset configuration table may be specified by the protocol or indicated by the base station.

In an embodiment of the present disclosure, the first determining module 901 includes: a first frequency hopping time domain granularity identifier acquiring unit, configured to acquire the RAR signaling or the DCI signaling sent by a base station, and acquire a first frequency hopping time domain granularity identifier from the RAR signaling or the DCI signaling; and a first frequency hopping time domain granularity determining unit, configured to determine the frequency hopping time domain granularity by querying a frequency hopping time domain granularity configuration table based on the first frequency hopping time domain granularity identifier. In an embodiment of the present disclosure, the first frequency hopping time domain granularity identifier may be an index configured to query the frequency hopping time domain granularity configuration table. In this embodiment, the frequency hopping time domain granularity configuration table may be specified by the protocol or indicated by the base station.

In an embodiment of the present disclosure, the frequency hopping offset configuration table, the number of frequency hopping configuration table, or the frequency hopping time domain granularity configuration table is specified by a protocol or indicated by a signaling.

In an embodiment of the present disclosure, the first determining module 901 includes: a RMSI receiving unit, configured to receive a first remaining minimum system information (RMSI) sent by the base station; and a first determining unit, configured to acquire one or more of the frequency hopping offset configuration table, the number of frequency hopping configuration table, and the frequency hopping time domain granularity configuration table from the first RMSI.

In an embodiment of the present disclosure, the first determining module 901 includes: a second RMSI acquiring unit, configured to acquire a second RMSI sent by a base station, and acquire a frequency hopping offset configuration table from the second RMSI; a second offset identifier acquiring unit, configured to acquire the RAR signaling or the DCI signaling sent by the base station, and acquire a second offset identifier from the RAR signaling or the DCI signaling; and a second frequency hopping offset determining unit, configured to determine the frequency hopping offset by querying the frequency hopping offset configuration table based on the second offset identifier.

In an embodiment of the present disclosure, a plurality of frequency hopping offset configuration tables are provided, and each frequency hopping offset configuration table corresponds to one number of frequency hopping.

In an embodiment of the present disclosure, the apparatus further includes: a corresponding module, configured to determine a frequency hopping offset configuration table corresponding to the number of frequency hopping based on the number of frequency hopping.

In an embodiment of the present disclosure, one frequency hopping offset configuration table is provided, each number of frequency hopping in the frequency hopping offset configuration table corresponds to one index value.

In an embodiment of the present disclosure, the second offset identifier is the index value.

In an embodiment of the present disclosure, a plurality of frequency hopping offset configuration tables may be summarized into a large table, and the second offset identifier may be determined as the index value. Since the plurality of frequency hopping offset configuration tables is summarized into the large table, resulting in the longer large table, an extended bit is required for representation.

In an embodiment of the present disclosure, the plurality of frequency hopping offset configuration tables may be summarized into the large table, and then the second offset identifier may be determined as the index value for searching. Since the plurality of frequency hopping offset configuration tables is summarized into the large table, resulting in the longer large table, the extended bit is required for representation. The extended bits may multiplex a TPC (power control) field in a RAR UL grant.

In an embodiment of the present disclosure, when repetition is required, coverage is poor, and the terminal generally transmits by using full power. At this point, the TPC (power control) field is invalid, therefore, the TPC field may be multiplexed as the extended bit (i.e. the second offset identifier).

In an embodiment of the present disclosure, the first determining module 901 includes: a third RMSI acquiring unit, configured to acquire a third RMSI sent by a base station, and acquire a number of frequency hopping configuration table from the third RMSI; a second number of frequency hopping identifier acquiring unit, configured to acquire the RAR signaling or the DCI signaling sent by the base station, and acquire a second number of frequency hopping identifier from the RAR signaling or the DCI signaling; and a second number of frequency hopping determining unit, configured to determine the number of frequency hopping by querying the number of frequency hopping configuration table based on the second number of frequency hopping identifier.

In an embodiment of the present disclosure, the first determining module 901 includes: a fourth RMSI acquiring unit, configured to acquire a fourth RMSI sent by a base station, and acquire a frequency hopping time domain granularity configuration table from the fourth RMSI; a second frequency hopping time domain granularity identifier acquiring unit, configured to acquire the RAR signaling or the DCI signaling sent by the base station, and acquire a second frequency hopping time domain granularity identifier from the RAR signaling or the DCI signaling; and a second frequency hopping time domain granularity determining unit, configured to determine the frequency hopping time domain granularity by querying the frequency hopping time domain granularity configuration table based on the second frequency hopping time domain granularity identifier.

In an embodiment of the present disclosure, one or more of the frequency hopping offset, the number of frequency hopping, and the frequency hopping time domain granularity are indicated by following messages: one or more of scheduling information of Message2 and retransmission scheduling information of Message2 and Message3.

Optionally, the apparatus further includes: a first frequency hopping manner determining module, configured to determine a frequency hopping manner, in which the frequency hopping is performed based on the frequency hopping offset, the number of frequency hopping, the frequency hopping time domain granularity, and the frequency hopping manner.

Optionally, the apparatus further includes: a second frequency hopping manner determining module, configured to acquire a repetition content; and determine the frequency hopping manner corresponding to the repetition content based on the repetition content.

Optionally, the frequency hopping manner is indicated by a RMSI, or by one or more of the scheduling information of Message2 and the retransmission scheduling information of Message2 and Message3.

FIG. 10 is a schematic diagram illustrating a structure of another apparatus for controlling frequency hopping provided in an embodiment of the present disclosure. The apparatus is performed by a base station. The apparatus includes a first sending module 1001.

The first sending module 1001 is configured to send indication information to a UE, in which the indication information is configured to indicate the UE to determine one or more of a frequency hopping offset, a number of frequency hopping, and a frequency hopping time domain granularity.

In an embodiment of the present disclosure, the first sending module 1001 is configured to send a RAR signaling or a DCI signaling to the UE, in which the RAR signaling or the DCI signaling includes a first offset identifier.

In an embodiment of the present disclosure, a UL Grant of the RAR signaling carries the first offset identifier.

In an embodiment of the present disclosure, a hopping offset configuration table is specified by a protocol, or is indicated by a signaling sent by a base station.

In an embodiment of the present disclosure, the first sending module 1001 is configured to send a RAR signaling or a DCI signaling to the UE, in which the RAR signaling or the DCI signaling includes a first number of frequency hopping identifier.

In an embodiment of the present disclosure, the first sending module 1001 is configured to send a RAR signaling or a DCI signaling to the UE, in which the RAR signaling or the DCI signaling includes a first frequency hopping time domain granularity identifier.

In an embodiment of the present disclosure, the first sending module 1001 is configured to send a first RMSI to the UE, in which the first RMSI includes one or more of the frequency hopping offset, the number of frequency hopping, and the frequency hopping time domain granularity.

In an embodiment of the present disclosure, the first sending module 1001 is configured to send a second RMSI to the UE, in which the second RMSI includes a frequency hopping offset configuration table; and sending a RAR signaling or a DCI signaling to the UE, in which the RAR signaling or the DCI signaling includes a second offset identifier.

In an embodiment of the present disclosure, a plurality of frequency hopping offset configuration tables are provided, and each frequency hopping offset configuration table corresponds to one number of frequency hopping.

In an embodiment of the present disclosure, the apparatus further includes: a second corresponding module, configured to determine a frequency hopping offset configuration table corresponding to the number of frequency hopping based on the number of frequency hopping.

In an embodiment of the present disclosure, one frequency hopping offset configuration table is provided, each number of frequency hopping in the frequency hopping offset configuration table corresponds to one index value.

In an embodiment of the present disclosure, the first offset identifier and the second offset identifier are the index values.

In an embodiment of the present disclosure, the first sending module 1001 is configured to send a third RMSI to the UE, in which the third RMSI includes a number of frequency hopping configuration table; and send a RAR signaling or a DCI signaling to the UE, in which the RAR signaling or the DCI signaling includes a second number of frequency hopping identifier.

In an embodiment of the present disclosure, the first sending module 1001 is configured to: send a fourth RMSI to the UE, in which the fourth RMSI includes a frequency hopping time domain granularity configuration table; and send a RAR signaling or a DCI signaling to the UE, in which the RAR signaling or the DCI signaling includes a second frequency hopping time domain granularity identifier.

FIG. 11 is a schematic diagram illustrating a structure of an apparatus for controlling frequency hopping provided in an embodiment of the present disclosure. The apparatus is performed by a base station. The apparatus includes a second determining module 1110 and a first providing module 1120.

The second determining module 1110 is configured to determine a frequency hopping offset, a number of frequency hopping, and a frequency hopping time domain granularity corresponding to a UE.

The first providing module 1120 is configured to provide a frequency hopping service for the UE according to the frequency hopping offset, the number of frequency hopping, and the frequency hopping time domain granularity corresponding to the UE.

In an embodiment of the present disclosure, at least one of the frequency hopping offset, the number of frequency hopping, and the frequency hopping time domain granularity is specified by a protocol.

In an embodiment of the present disclosure, the second determining module 1110 includes: a second number of repetitions acquiring unit, configured to acquire a number of repetitions corresponding to the UE; and a second number of frequency hopping generating unit, configured to generate the number of frequency hopping based on the number of repetitions and the frequency hopping time domain granularity. For example, different combinations of the number of repetitions and the frequency hopping time domain granularity may have a correspondence relationship with the number of frequency hopping, which is determined by one or more formulas or tables. The formula or table may be specified by a protocol or configured for a UE by the base station, such that the UE may acquire the formula or table, and then acquire the number of frequency hopping corresponding to a specific combination of number of repetitions and frequency hopping time domain granularity from the one or more formulas or tables. In addition, the formula or table may also be specified by a protocol or pre-configured in a communication device by factory settings of the communication device. In an embodiment, the base station may send a control signal to a terminal as required, and a formula or table to be applied in a current communication is indicated in the control signal, to notify the terminal to activate the formula or table.

In an embodiment of the present disclosure, the apparatus further includes: a number of frequency hopping corresponding to UE acquiring unit, configured to acquire the number of frequency hopping corresponding to the UE; a frequency hopping offset configuration table corresponding to UE determining unit, configured to determine a frequency hopping offset configuration table corresponding to the UE based on the number of frequency hopping; and a frequency hopping offset corresponding to UE determining unit, configured to determine the frequency hopping offset corresponding to the UE based on the frequency hopping offset configuration table.

In an embodiment of the present disclosure, the apparatus further includes: a frequency hopping manner corresponding to UE determining unit, configured to determine a frequency hopping manner corresponding to the UE, in which, providing the frequency hopping service for the UE is based on the frequency hopping offset, the number of frequency hopping, the frequency hopping time domain granularity, and the frequency hopping manner corresponding to the UE.

In an embodiment of the present disclosure, the frequency hopping manner corresponding to UE determining unit is configured to acquire a repetition content corresponding to the UE; and determine the frequency hopping manner corresponding to the repetition content based on the repetition content.

According to the embodiments of the disclosure, the embodiments of the disclosure provide a communication device and a readable storage medium.

Figure 12:
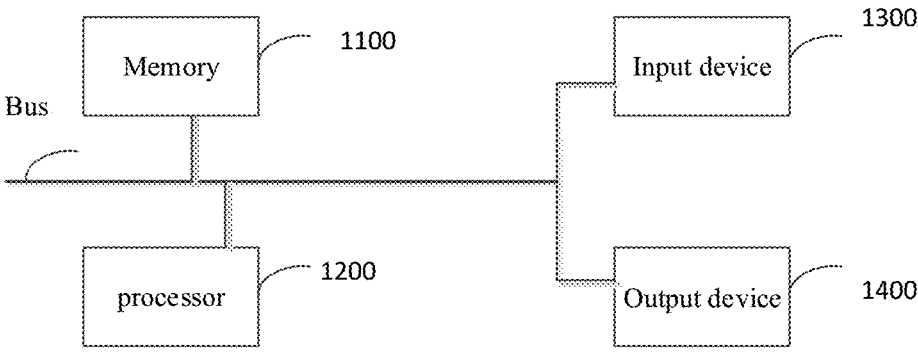
FIG. 12 is a schematic diagram illustrating a structure of a communication device provided in an embodiment of the present disclosure.

FIG. 12 is a block diagram of a communication device used to implement a method for controlling frequency hopping according to embodiments of the disclosure. Communication devices are intended to represent various forms of digital computers, such as laptop computers, desktop computers, workbenches, personal digital assistants, servers, blade servers, mainframe computers, and other suitable computers. Communication devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 12, the communication device includes: one or more processors 1100, a memory 1200, and interfaces for connecting various components, including a high-speed interface and a low-speed interface. The various components are interconnected using different buses and can be mounted on a common mainboard or otherwise installed as required. The processor may process instructions executed within the communication device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of communication devices can be connected, each providing some of the necessary operations (for example, as a server array, a group of blade servers, or a multiprocessor system). A processor 1100 is taken as an example in FIG. 12.

The memory 1200 is a non-transitory computer-readable storage medium according to the disclosure. The memory stores instructions executable by at least one processor, so that the at least one processor executes the method for controlling frequency hopping according to the disclosure. The non-transitory computer-readable storage medium of the disclosure stores computer instructions, which are used to cause a computer to execute the method for controlling frequency hopping according to the disclosure.

As a non-transitory computer-readable storage medium, the memory 1200 is configured to store non-transitory software programs, non-transitory computer executable programs and modules, such as program instructions/modules (for example, the first determining module 901 and the first processing module 902 shown in FIG. 9, or the first sending module 1001 shown in FIG. 10, or the second determining module 1110 and first providing module 1120 shown in FIG. 11) corresponding to the method for controlling frequency hopping in the embodiments of the disclosure. The processor 1200 executes various functional applications and data processing of the communication device by running non-transitory software programs, instructions, and modules stored in the memory 1100, that is, implementing the method for controlling frequency hopping in the foregoing method embodiments.

The memory 1100 may include a storage program area and a storage data area, where the storage program area may store an operating system and application programs required for at least one function. The storage data area may store data created according to the use of the communication device for implementing the method. In addition, the memory 1100 may include a high-speed random access memory, and a non-transitory memory, such as at least one magnetic disk storage device, a flash memory device, or other non-transitory solid-state storage device. In some embodiments, the memory 1100 may optionally include a memory remotely disposed with respect to the processor 1200, and these remote memories may be connected to the communication device for implementing the method through a network. Examples of the above network include, but are not limited to, the Internet, an intranet, a local area network, a mobile communication network, and combinations thereof.

The device for controlling frequency hopping may further include: an input device 1300 and an output device 1400. The memory 1100, the processor 1200, the input device

1300, and the output device 1400 may be connected through a bus or in other manners. In FIG. 12, the connection through the bus is taken as an example.

The input device 1300 may receive inputted numeric or character information, and generate key signal inputs related to user settings and function control of the communication device for implementing the method, such as a touch screen, a keypad, a mouse, a trackpad, a touchpad, an indication rod, one or more mouse buttons, trackballs, joysticks and other input devices. The output device 1400 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and block-chain network.

The computer system may include a client and a server. The client and server are generally remote from each other and interacting through a communication network. The client-server relation is generated by computer programs running on the respective computers and having a client-server relation with each other.

According to the apparatus for controlling frequency hopping provided in embodiments of the present disclosure, the frequency hopping offset, the number of frequency hopping, and the frequency hopping time domain granularity are determined, and the frequency hopping is performed based on the frequency hopping offset, the number of frequency hopping, and the frequency hopping time domain granularity. Therefore, by means of performing the frequency hopping based on the frequency hopping offset, the number of frequency hopping, and the frequency hopping time domain granularity, coverage is enhanced, a frequency diversity gain is to obtained, and a cross-slot channel estimation frequency hopping manner is achieved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for controlling frequency hopping, performed by a user equipment (UE), comprising:
   determining a frequency hopping offset, a number of frequency hopping, a frequency hopping time domain granularity, and a frequency hopping manner; and
   performing frequency hopping based on the frequency hopping offset, the number of frequency hopping, the frequency hopping time domain granularity, and a frequency hopping manner;
   wherein one or more of the frequency hopping offset, the number of frequency hopping, and the frequency hopping time domain granularity are indicated by one or more of scheduling information of Message2, Message2 or retransmission scheduling information of Message3;
   wherein determining the frequency hopping offset comprises:
   acquiring a random access response (RAR) signaling or a downlink control information (DCI) signaling sent by a base station, and acquiring a first offset identifier from the RAR signaling or the DCI signaling; and
   determining the frequency hopping offset by querying a frequency hopping offset configuration table based on the first offset identifier;

wherein an uplink scheduling grant (UL Grant) of the RAR signaling carries the first offset identifier;
   wherein determining the frequency hopping manner comprising:
   acquiring a repetition content; and
   determining the frequency hopping manner corresponding to the repetition content based on the repetition content.

2. The method according to claim 1, wherein at least one of the frequency hopping offset, the number of frequency hopping, and the frequency hopping time domain granularity is specified by a protocol or indicated by a base station.

3. The method according to claim 2, wherein determining the frequency hopping offset, the number of frequency hopping, and the frequency hopping time domain granularity comprises:
   receiving a first remaining minimum system information (RMSI) sent by the base station; and
   acquiring one or more of the frequency hopping offset, the number of frequency hopping, and the frequency hopping time domain granularity from the first RMSI.

4. The method according to claim 1, wherein determining the number of frequency hopping comprises:
   acquiring a number of repetitions; and
   generating the number of frequency hopping based on the number of repetitions and the frequency hopping time domain granularity.

5. The method according to claim 1, wherein determining the number of frequency hopping comprises:
   acquiring a RAR signaling or a DCI signaling sent by a base station, and acquiring a first number of frequency hopping identifier from the RAR signaling or the DCI signaling; and
   determining the number of frequency hopping by querying a number of frequency hopping configuration table based on the first number of frequency hopping identifier.

6. The method according to claim 1, wherein determining the frequency hopping time domain granularity comprises:
   acquiring a RAR signaling or a DCI signaling sent by a base station, and acquiring a first frequency hopping time domain granularity identifier from the RAR signaling or the DCI signaling; and
   determining the frequency hopping time domain granularity by querying a frequency hopping time domain granularity configuration table based on the first frequency hopping time domain granularity identifier.

7. The method according to claim 1, wherein the frequency hopping offset configuration table is specified by a protocol or indicated by a signaling.

8. The method according to claim 1, wherein determining the frequency hopping offset comprises:
   acquiring a second RMSI sent by a base station, and acquiring a frequency hopping offset configuration table from the second RMSI;
   acquiring a RAR signaling or a DCI signaling sent by the base station, and acquiring a second offset identifier from the RAR signaling or the DCI signaling;
   determining the frequency hopping offset by querying the frequency hopping offset configuration table based on the second offset identifier.

9. The method according to claim 1, wherein a plurality of frequency hopping offset configuration tables are provided, and each frequency hopping offset configuration table corresponds to one number of frequency hopping; or one frequency hopping offset configuration table is provided, and each number of frequency hopping in the frequency hopping offset configuration table corresponds to one index value.

10. The method according to claim 9, further comprising:
determining the frequency hopping offset configuration table corresponding to the number of frequency hopping based on the number of frequency hopping.

11. The method according to claim 1, wherein determining the number of frequency hopping comprises:
acquiring a third RMSI sent by a base station, and acquiring a number of frequency hopping configuration table from the third RMSI;
acquiring a RAR signaling or a DCI signaling sent by the base station, and acquiring a second number of frequency hopping identifier from the RAR signaling or the DCI signaling;
determining the number of frequency hopping by querying the number of frequency hopping configuration table based on the second number of frequency hopping identifier.

12. The method according to claim 1, wherein determining the frequency hopping time domain granularity comprises:
acquiring a fourth RMSI sent by a base station, and acquiring a frequency hopping time domain granularity configuration table from the fourth RMSI;
acquiring a RAR signaling or a DCI signaling sent by the base station, and acquiring a second frequency hopping time domain granularity identifier from the RAR signaling or the DCI signaling;
determining the frequency hopping time domain granularity by querying the frequency hopping time domain granularity configuration table based on the second frequency hopping time domain granularity identifier.

13. The method according to claim 1, wherein the frequency hopping manner is indicated by a RMSI, or by one or more of the scheduling information of Message2 and the retransmission scheduling information of Message2 and Message3.

14. A method for controlling frequency hopping, performed by a base station, comprising:
sending indication information to a UE, wherein the indication information is configured to indicate the UE to determine one or more of a frequency hopping offset, a number of frequency hopping, a frequency hopping time domain granularity, and a frequency hopping manner;

wherein one or more of the frequency hopping offset, the number of frequency hopping, and the frequency hopping time domain granularity are indicated by one or more of scheduling information of Message2, Message2 or retransmission scheduling information of Message3;

wherein sending the indication information to the UE comprises:

sending a random access response (RAR) signaling or a downlink control information (DCI) signaling to the UE, wherein the RAR signaling or the DCI signaling comprises a first offset identifier, wherein the first offset identifier is used to determine the frequency hopping offset by querying a frequency hopping offset configuration table based on the first offset identifier;

wherein an uplink scheduling grant (UL Grant) of the RAR signaling carries the first offset identifier;

wherein the frequency hopping manner corresponding to a repetition content is determined based on a repetition content.

15. A method for controlling frequency hopping, performed by a base station, comprising:
determining a frequency hopping offset, a number of frequency hopping, a frequency hopping time domain granularity corresponding to a UE, and a frequency hopping manner; and
providing a frequency hopping service for the UE according to the frequency hopping offset, the number of frequency hopping, the frequency hopping time domain granularity corresponding to the UE, and the frequency hopping manner;

wherein one or more of the frequency hopping offset, the number of frequency hopping, and the frequency hopping time domain granularity are indicated by one or more of scheduling information of Message2, Message2 or retransmission scheduling information of Message3;

wherein the frequency hopping offset is determined by querying a frequency hopping offset configuration table based on a first offset identifier;

wherein determining the frequency hopping manner corresponding to the UE comprises:

acquiring a repetition content corresponding to the UE;

determining the frequency hopping manner corresponding to the repetition content based on the repetition content.

* * * * *